Feb. 19, 1924. 1,484,504
L. C. KEMP
MEANS FOR REGULATING TURBOBLOWERS AND OTHER APPARATUS FOR DELIVERING
FLUID UNDER PRESSURE OR SUCTION
Filed Aug. 10, 1921  2 Sheets-Sheet 1
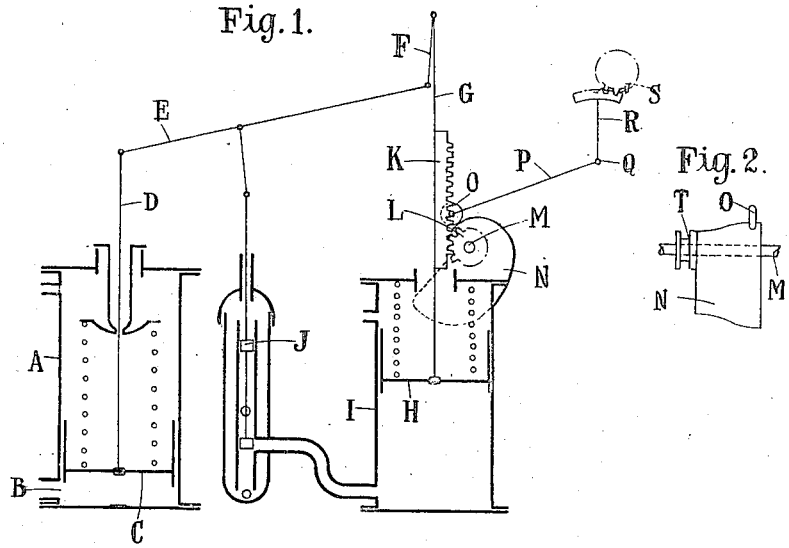
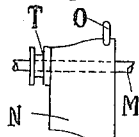
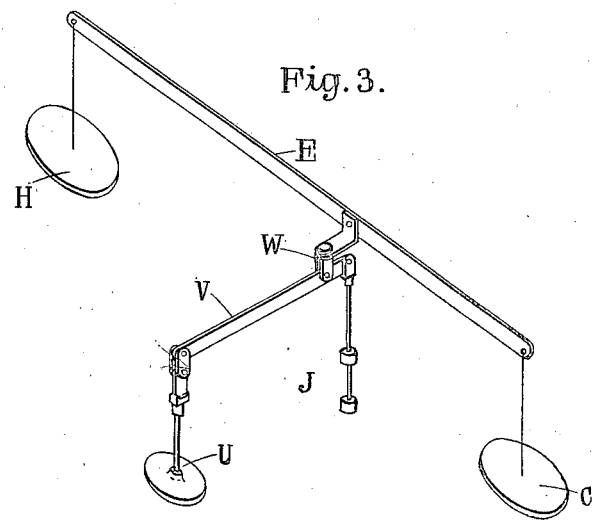
INVENTOR
Leslie Charles Kemp
By Bakewell, Byrnes & Stebbins

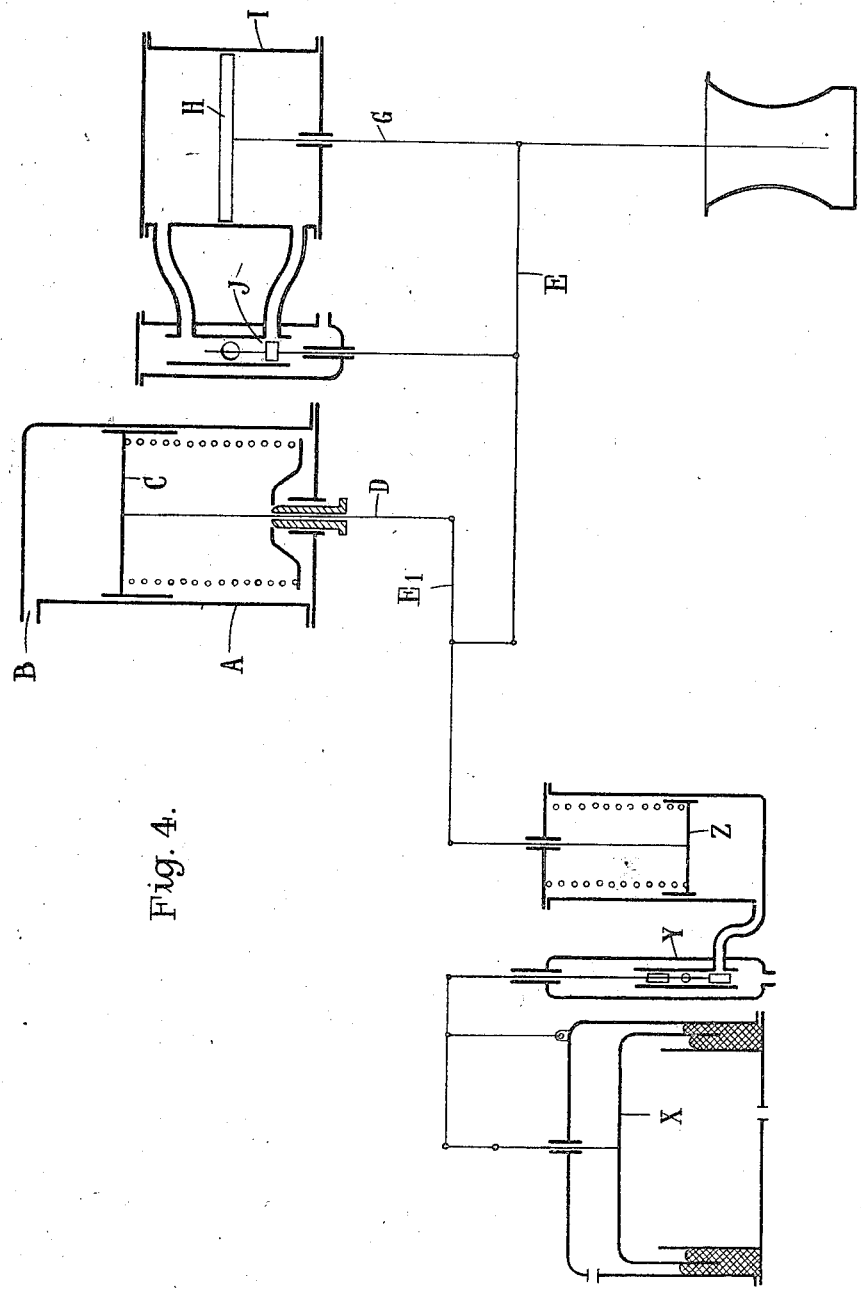

Patented Feb. 19, 1924.

1,484,504

UNITED STATES PATENT OFFICE.

LESLIE CHARLES KEMP, OF LONDON, ENGLAND.

MEANS FOR REGULATING TURBOBLOWERS AND OTHER APPARATUS FOR DELIVERING FLUID UNDER PRESSURE OR SUCTION.

Application filed August 10, 1921. Serial No. 491,238.

*To all whom it may concern:*

Be it known that I, LESLIE CHARLES KEMP, subject of the King of England, residing in London, England, have invented certain new and useful Improved Means for Regulating Turboblowers and Other Apparatus for Delivering Fluid Under Pressure or Suction, of which the following is a specification.

This invention relates to the regulation of apparatus such as turbo blowers which supply fluid under pressure or suction and in which there is a definite relation between the quantity delivered, the suction or pressure produced and the speed at which the apparatus is driven, such a relation being capable of being shown by a series of constant speed curves on the pressure (or suction) and volume chart or by a series of constant volume curves on a pressure (or suction) speed chart or by a series of constant pressure (or suction) curves on a volume speed chart.

In the following, reference will only be made to pressure for the sake of simplicity but it will be understood that unless the context indicates otherwise the term is to be used as including suction as an alternative.

The principal object of the invention is to provide an improved means for regulating apparatus of the kind indicated so as to adjust the speed to maintain the volume constant under variations of pressure. In this improved regulating means is employed a loaded piston, diaphragm or equivalent arrangement which is subjected to the pressure in the delivery pipe and movement is transmitted from this piston or other member to a device by which the speed of the driving apparatus is controlled. In general the relation between pressure and volume delivered is not such that a constant rate of delivery can be obtained by a movement of the speed controlling member proportional at all times to the movement of the parts subjected to the delivery pressure and in accordance with this invention the movement imparted by the action of the pressure is modified by a device embodied in or acting on the transmission mechanism so as to obtain close accuracy of regulation for constant volume of delivery. In general in apparatus of the kind to which this invention is intended to apply, there is a rough proportionality between the movement imparted by the pressure change and the displacement to be given to the speed controlling member to obtain re-adjustment for constant volume so that it is only necessary for the modifying device to have a comparatively small range of action in giving a subsidiary adjustment added to or subtracted from the principal adjustment effected by the displacement of the pressure actuating member.

In one form of the invention the modifying device consists of a cam or equivalent mechanism through which is transmitted the movement produced by the piston or other arrangement to the speed controlling member, this cam device being designed in accordance with the relation between pressure of delivery, volume delivered and speed of rotation of the apparatus to which the regulating means is applied. The nature of this modification will be most easily recognized by considering the case of a cam which is moved in one direction proportionately to the change in pressure and imparts at the same time motion to a second member in a direction at right angles to the movement of the cam, the movement of this second member being effective to produce a speed variation proportionate to the movement. Under these conditions the cam will have the simple form of a plate cut out to the form of the curve which forms a constant volume line on the speed-pressure chart with rectangular co-ordinates. This description of the particular form of cam has only been given as a simple illustration to enable the invention to be understood. In general the simple proportionality between the movements of the members and the variations which they result from or are to produce which has been assumed in this case may not be obtained but, having recognized the general method of modification of the movement in its transmission, it will readily be seen how the shape of the cam can be adjusted to suit the mechanism used. It will also be recognized that in cases where the various constant volume lines on the pressure-speed chart are of similar form, such for instance, that several of them can be approximately represented by the location of a single curve at different points on the chart for the range of regulation required then it may be possible to arrange the cam device or the mechanism by which motion is transmitted to or from it so that a displacement of the cam surface or adjustment of the mechanism may be made to set the regulator for any one of several rates of delivery within a particular range.

The modifying arrangement just described may be called a series arrangement since the motion due to the static pressure of delivery is transmitted through the modifying arrangement. As distinguished from this the modifying arrangement about to be mentioned may be called a parallel arrangement since the motion to be modified is not transmitted through the modifying arrangement but this arrangement acts on the transmission mechanism so as to produce a subsidiary movement of some part thereby causing the application of a differentiating influence to the transmission.

As the source of the modifying influence a piston or equivalent (hereafter spoken of as a piston) is employed, subjected to a dynamic pressure due to the rate of delivery of fluid. The pressure referred to as dynamic is such as is produced by the joint action of the two members of a Pitot tube or of a Venturi tube inserted in the delivery pipe and in general it depends only on the velocity of the flow and the density of the fluid and is independent of the static pressure (except in so far as it influences the density) and is also independent of the design of the fluid-delivering apparatus.

While the dynamic pressure available may be small compared with the static pressure, a dynamic pressure device may be made very sensitive provided that the conditions for which it is to be effective are limited to a compartively small range. This limitation is effected in the present case since the main adjustment is produced by the separate static pressure device and the dynamic pressure arrangement is only required to make a subsidiary fine adjustment to cover the difference between the rough setting of the speed control by the static pressure device and the actual adjustment required for constant volume delivery. For instance, the static pressure device may be made to adjust the speed so that at all times the rate of delivery is kept within 10 or 15% of the rate required, then the subsidiary modifying arrangement influenced by the rate of delivery is only required to make up the difference of adjustment necessary to bring this 10 or 15% down to 3 or 5% of the required rate which approximation is sufficiently close for the purpose in view.

Several forms of the invention will be described by the aid of the accompanying diagrammatic drawings. Figure 1 shows in section a regulating arrangement in which a cam is employed to modify the movement transmitted from the static pressure piston to the speed controlling member. Figure 2 shows a detail of an arrangement for adjusting the mechanism shown in Figure 1 for various constant volume settings. Figure 3 shows in perspective the application of an auxiliary modifying device under dynamic pressure control to an arrangement as shown in Figure 1. Figure 4 shows in section a static pressure piston device and a dynamic pressure piston device acting in parallel on a transmitting arrangement for imparting motion to a speed controlling device which is shown as a throttle valve for the stem supply.

In the arrangement shown in Figure 1, the lower end of the cylinder A is connected with the delivery pipe through the inlet B so that the lower face of the piston C is subjected to the static pressure of delivery. The upper end of the cylinder A is open to the atmosphere and contains an adjustable spring pressing on the piston and opposing the pressure acting on its lower face. The upper end of the piston rod D is pivotally connected with one end of a lever E the other end of which engages through a short link F the rod G of a piston H working in a relay cylinder I. The inflow and outflow of liquid under pressure to the lower end of this cylinder I is controlled by a pilot valve J connected by means of a link with the lever E. This method of interconnection of the primary piston C relay piston H and pilot valve J so that the relay piston is caused to copy the movement of the primary piston is of a well-known type.

The upper part of the cylinder I is open to the atmosphere and contains a spring opposing the upward movement of the piston H. On the rod G is mounted a rack K which gears with the pinion L fixed on a shaft M which also carries a cam N. On this cam works a roller O carried by an arm P which turns about the fixed point Q and carries with it the arm R having at its end a toothed sector gearing with the pinion S.

It will be seen that the movement of the piston C produces a corresponding movement of the piston H. If the free end of the arm P were actuated directly by the piston rod G, the pinion S would receive an angular movement related to that of the piston H (and accordingly to that of the piston C) in a simple manner determined by the geometry of the transmitting mechanism. With mechanism having its parts proportioned as shown in the drawing the angular movement of the pinion S would be very approximately directly proportionate to the movement of the piston H throughout its travel. If the movement of the pinion S were transmitted to the speed control device in a manner which retained this proportionality, the adjustment of the said device would be in direct proportion to the movement of the piston C. This in general would not give an adjustment of speed such as to maintain constant the rate of delivery (e. g. cubic feet per second) for fluid delivering apparatus of the centrifugal type. The same fault is to be found in all simple transmitting mechanisms such as are used with this class of apparatus, namely that the relationship between the movements of their two ends does not follow closely the relationship required for governing apparatus of the type mentioned for constant rate of delivery, taking as the actuating member a piston subjected to the static pressure of delivery and opposed by a device, such as a spring, which also obeys a simple law of proportion of resistance to the movement of the piston.

In the mechanism as shown in the drawing is inserted a part, namely the cam N, by means of which the movement originated at the piston C can be modified in transmission to the pinion S, so that the simple relationship between the movements of the ends of the mechanism determined by the proportions and disposition of the other parts can be departed from in an arbitrary manner at the choice of the designer, and thereby the movement of the pinion S may be made of such a relationship to the movement of the piston C that desired result is obtained. Each position of piston C corresponds to a particular value of the static pressure against which the apparatus is delivering. By giving an appropriate shape to the cam N the speed of the apparatus (e. g. a centrifugal blower) can be brought to a value appropriate to give the same rate of delivery of fluid for all positions of the piston C. In determining the shape of the cam it is clearly necessary to take into account the position of the piston C as related to the fluid pressure applied to it, the form of the rest of the mechanism, the relation of the position of the pinion S to the speed of the apparatus and the relation between speed of rotation and pressure of delivery for a constant rate of delivery from the apparatus. These are all known or readily determinable relationships. The last mentioned is fixed by the design of the fluid delivering apparatus and is, therefore, the most important part of the data. The others may in many cases be chosen or adjusted by the designer of the controlling mechanism. In any case when the relationships mentioned have been determined, anyone skilled in the art will be able to fix the shape of the cam for the given set of conditions, having regard to the foregoing indication of the lines of procedure.

The pinion S can be caused to actuate directly or through a relay the speed controlling member such as the throttle valve of a turbine. This actuation may be made independently or conjointly with the ordinary speed governor mechanism. Where the speed and volume governors operate conjointly, the interconnection may be made by means of a lever one end of which engages in the governor sleeve while the other is arranged to be moved by the pinion S for instance through a crank carried on its shaft. This lever is connected at an appropriate point with a throttle valve spindle or with a pilot valve of a relay so that the valve is subjected to the influence of the pressure of the volume governor and to that of the speed governor. The latter would require to be so designed that it is sensitive over a considerable range of speed and the leverage should be so adjusted that the full travel of the valve can be obtained with a comparatively small variation in speed of the governor at any position of the end of the lever controlled by the volume governor. Alternatively, the pinion S may be caused to adjust the tension of the speeder spring of a centrifugal governor.

Where the driving apparatus is an electric motor the roller which works on the cam surface will be arranged so as to impart motion to the rheostat or other device by which the speed is adjusted.

In order that the volume governor may be set so as to be effective to control for any one of a number of rates of delivery within a given range, the cam M may be shaped and may be adjustable as indicated in Figure 2 where it is shown as being capable of sliding axially on the shaft M so as to bring different portions of the cam under the roller O. The axial position of the cam is adjusted by means of a fork engaging the collar T which fork may be adjusted in position by a hand wheel or other equivalent device. By giving an appropriate form to the cam, it may be arranged that a given displacement of the piston C corresponds to a different movement of the roller O about the point Q for each axial setting of the cam N and that in each case the course followed by the roller O for the stroke of the piston C is appropriate for the relationship between pressure of delivery and volume delivered.

With a certain type of blower the pressure volume characteristic over part of its range of working is practically flat, that is to say, the pressure remains practically constant for a considerable variation in the volume delivered. It is obvious therefore that under such conditions the cam device in itself is not sufficient for producing the necessary modification of adjustment but by applying a subsidiary adjusting device under the influence of the dynamic pressure due to the rate of delivery to the transmitting mechanism the situation may be dealt with. This application may be made by causing a velocity controlled piston device to act upon some part of the transmitting mechanism so as to produce a subsidiary adjustment independent of that due to the static pressure piston device when the volume delivered departs from the required standard. The subsidiary adjustment may for instance be made by the displacement of the fulcrum of one of the transmitting levers or by giving additional movement to some part of a relay valve so that the positions of these parts no longer correspond to equilibrium conditions between the speed of the machine and the static pressure of delivery. This brings the static pressure device into action to re-establish this equilibrium which owing to the action of the subsidiary device cannot be brought about until the volume delivered has been brought back to the required standard. An example of the application of the subsidiary adjustment is shown in Figure 3 of the drawings. In this figure the parts which correspond to parts shown in Figure 1 have the same reference letters. For the sake of simplicity the link F and the rack K with the parts operated therefrom as well as the two cylinders and the valve casing have been omitted. A third piston U is shown for the purpose of indicating the member on which the dynamic pressure due to the rate of delivery acts. This piston is suitably loaded, being preferably of the construction more fully described hereafter in connection with Figure 4 and it moves from its equilibrium position whenever a sufficient change in the rate of delivery takes place. When it moves, it raises or lowers one end of the lever V which is pivotally connected by means of a short link W to a bracket carried by the lever V. The lever V extends beyond the link W for a short distance and is connected with the pilot valve J so that any movement of the piston U is associated with a displacement of the pilot valve J resulting in a movement of the piston H and its associated parts thus causing a change of speed and consequently a change of static pressure of delivery so that the piston C comes into action and the adjustment of the piston H is continued until the desired rate of delivery is re-established.

The subsidiary adjusting device influenced by the dynamic pressure of delivery also finds its application in cases where the cam mechanism is dispensed with. Such an application is indicated in Figure 4 of the drawings. In this drawing the parts corresponding to parts shown in Figure 1, are given the same reference letters. It will be noted that in this arrangement the relay piston H controlled by the pilot valve J acts directly by means of its piston rod G on the speed controlling member which is here shown as the throttle valve of a turbine driving the blower. This arrangement is, however, only shown by way of example and other types of speed controlling members and other methods of influencing them might be adopted.

The lever E with which the pilot valve J and piston rod G are connected is moved under the joint influence of the static pressure piston C and the dynamic pressure piston X. The movement of the latter is transmitted through the pilot valve Y to the relay piston Z which is connected at one end to the lever $E^1$ to the other end of which the piston rod D is connected through a link. It is accordingly seen that movement of the lever E results from the two displacements due to the static and dynamic pressures respectively. This arrangement is indicated simply by way of example of a means for bringing about the joint influencing of a transmitting arrangement by the two devices. In such joint action it is preferable that the dynamic pressure piston device should be made sluggish so that it does not begin to have any material action until the main adjustment has been effected by the static pressure piston device. This protects the former device from the necessity for making any large range of movement. One way of producing this sluggish action is to provide that the relay piston Z may be retarded in its movement by the use of a restricted port in the pilot valve Y or of a throttling valve located at some point in the connecting pipe.

The dynamic pressure piston device X is shown diagrammatically in a form possessing the necessary degree of sensitiveness for the practical requirements of the case in view. In this arrangement the piston X is formed as a bell closed in a chamber having in its lower part a well or trough containing mercury into which the lower edge of the piston dips so that the mercury forms both a seal and a support for the weight of the piston which floats in the mercury and accordingly can be displaced through a considerable distance by the application of a comparatively small pressure difference to its opposite faces. This pressure difference may be caused by connecting the static and velocity members of a Pitot tube to the opposite ends of the chamber containing the piston.

I declare that what I claim as my invention is as follows:—

1. Means for actuating the speed-controlling device of apparatus that is required to deliver fluid at an approximately constant rate against varying pressure, comprising in combination a loaded piston device subjected to and moveable by the static pressure at the place of delivery, means for transmitting motion from the said piston device to a speed-controlling device for the fluid-delivering apparatus in accordance with a determined relationship giving a rough approximation to the speed adjustment required, and means acting upon said transmitting means for modifying the motion imparted by the piston device before it reaches the speed controlling device so as to produce a departure from the said relationship to a closer approximation to the required speed adjustment.

2. Means for actuating the speed-controlling device of apparatus that is required to deliver fluid at an approximately constant rate against varying pressure, comprising in combination a loaded piston device subjected to and moveable by the static pressure at the place of delivery, means for transmitting motion from said piston device to a speed-controlling device for the fluid-delivering apparatus in accordance with a determined relationship giving a rough approximation to the speed adjustment required, and motion modifying means comprising a cam inserted in said transmitting means and shaped so as to produce a departure from the said relationship to a closer approximation to the required speed adjustment.

3. Means for actuating the speed-controlling device of apparatus that is required to deliver fluid at an approximately constant rate against varying pressure, comprising in combination a loaded piston device subjected to and moveable by the static pressure at the place of delivery, means for transmitting motion from the said piston device to a speed-controlling device for the fluid-delivering apparatus, a second piston device subjected to and moveable by a dynamic pressure due to the rate of delivery of fluid by the apparatus, and means actuated by said device and acting upon some intermediate point in the transmitting means for imparting thereto additional movement due to the displacement of the said second piston device.

4. Means for actuating the speed-controlling device of apparatus that is required to deliver fluid at an approximately constant rate against varying pressure, comprising in combination a loaded piston device subjected to and moveable by the static pressure at the place of delivery, means for transmitting motion from said piston device to a speed-controlling device for the fluid-delivering apparatus, said transmitting means comprising a relay mechanism including a pilot valve moveable under the influence of said piston device, a second piston device subjected to and moveable by a dynamic pressure due to the rate of delivery of fluid by the apparatus and operative connecting means between said piston device and said pilot valve whereby movement may be imparted to said valve when said second piston device is displaced, thus modifying the movement imparted by the first piston device.

5. Means for actuating the speed-controlling device of apparatus that is required to deliver fluid at an approximately constant rate against varying pressure, comprising in combination a loaded piston device subjected to and moveable by the static pressure at the place of delivery, means for transmitting motion from the said piston device to a speed-controlling device for the fluid-delivering apparatus in accordance with a determined relationship giving a rough approximation to the speed adjustment required, and motion modifying means comprising a cam inserted in the said transmitting means and shaped so as to produce a departure from the said relationship to a closer approximation to the required speed adjustment, in combination with a second piston device subjected to and moveable by a dynamic pressure due to the rate of delivery of fluid by the apparatus and operatively connected with said transmitting means.

6. Means for actuating the speed-controlling device of apparatus that is required to deliver fluid at an approximately constant rate against varying pressure, comprising in combination a loaded piston device subjected to and moveable by the static pressure at the place of delivery, means for transmitting motion from the said piston device to a speed-controlling device for the fluid-delivering apparatus in accordance with a determined relationship giving a rough approximation to the speed adjustment required, said means comprising a relay mechanism and a pilot valve controlling said mechanism, motion modifying means comprising a cam inserted in said transmitting means and shaped so as to produce a departure from the said relationship to a closer approximation to the required speed adjustment, a second piston device subjected to and moveable by a dynamic pressure due to the rate of delivery of fluid by the apparatus, operative connecting means between said second piston device and the said pilot valve whereby movement may be imparted to said valve additional to the movement transmitted from the first piston device, so that this first piston device may be brought into effective action in cases where the fluid-delivering apparatus is such that the static pressure of delivery at a constant speed of rotation of the apparatus remains approximately constant over an appreciable range of variation of the rate of delivery.

In testimony whereof I affix my signature.

LESLIE CHARLES KEMP.